(12) United States Patent
Price et al.

(10) Patent No.: US 6,384,998 B1
(45) Date of Patent: May 7, 2002

(54) MULTIPLEXING SERVO TRACKING SIGNALS IN A DISK DRIVE

(75) Inventors: Kirk Barrows Price; Mantle Man-Hon Yu, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/376,263

(22) Filed: Aug. 17, 1999

(51) Int. Cl.⁷ .............................................. G11B 5/00
(52) U.S. Cl. .................... 360/51; 360/78.14; 360/77.08
(58) Field of Search ............................ 360/51, 31, 78, 360/14, 75, 61, 63, 77.05, 77.02, 77.07, 77.08

(56) References Cited

U.S. PATENT DOCUMENTS

| | | | |
|---|---|---|---|
| 5,132,854 A | * | 7/1992 | Tsuyoshi et al. .......... 360/78.14 |
| 5,343,347 A | | 8/1994 | Gilovich |
| 5,463,603 A | * | 10/1995 | Petersen ...................... 360/61 |
| 5,621,591 A | | 4/1997 | Rahimi et al. |
| 5,761,007 A | | 6/1998 | Price et al. |
| 5,781,381 A | | 7/1998 | Koganezawa et al. |
| 5,805,386 A | | 9/1998 | Faris |
| 5,841,610 A | | 11/1998 | Battu et al. |

* cited by examiner

Primary Examiner—Alan T. Faber
(74) Attorney, Agent, or Firm—Gates & Cooper LLP (57) ABSTRACT

A method, apparatus, and article of manufacture for controlling a disk drive with multiple VCMs is disclosed. The apparatus comprises a first disk storage surface and a second disk storage surface. The first disk storage surface has a plurality of first data segments and a plurality of first servo track segments interspersed therebetween, and is readable and writeable by a first head controllable according to a first servo track signal read from at least one of the first servo track segments. The second disk storage surface has a plurality of second data segments and a plurality of second servo track segments interspersed therebetween, and is readable and writeable a second head separately controllable from the first head according to a second servo track signal read from at least one of the plurality of second servo track segments. The first and second servo track signals are distinguishable by a servo signal characteristic, which allows a single signal transmittable on a single wire to convey the required servo track information to all of the heads.

12 Claims, 9 Drawing Sheets

MULTIPLEXING SERVO TRACKING SIGNALS IN A DISK DRIVE

BACKGROUND OF THE INVENTION

1. Field of the Invention

The present invention relates to systems and methods for writing and reading data from computer disk drives, and in particular to a method and system for reading and writing data using a disk drive having independently controllable heads or arms.

2. Description of the Related Art

Disk and tape data storage devices are well known in the art. The data is stored as a plurality of data tracks of predetermined format disposed on a recording medium such as a magnetic disk, an optical disk, or magnetic tape. The data is written to and read from the tracks using one or more transducers or read/write heads, which are electrically coupled to signal processing electronics to provide a data transfer path between the media and a requesting system external to the storage device.

The heads are supported in close proximity to the media by a head positioning assembly capable of operating in two distinct modes: track seeking and track following. During track seeking, the heads are moved transversely to the tracks from a current data track to a desired or target track in response to a read or write request from the external system. Track following is the function of maintaining a head in alignment with a track while reading, writing, or merely idling.

In most storage devices, movement of the head positioning assembly is controlled by a closed loop servo system comprising a combination of servo electronics and microcode providing a signal to a voice coil motor (VCM) or similar device. Closed loop systems utilize position information obtained from the surface of the storage medium as feedback to perform the seeking and track following functions. Examples of closed loop servo control system are provided in commonly assigned U.S. Pat. Nos. 4,679,103 and 5,404,254, which applications are hereby incorporated by reference herein. Some disk drive designs hold servo information on a single, dedicated disk surface (i.e., dedicated servo). Other disk drive designs, and most tape drives, provide servo information embedded between the data regions of the storage media (i.e., embedded servo) in the form of a PES field. The PES field is written using an external positioning device known as a pusher or a servowriter, and read with a magnetoresistive read element. Unfortunately, because of manufacturing tolerances, the read and writing elements can vary in width, which can cause the sensed head position to vary non-linearly with the actual head position.

Servo information typically includes a track identifier and a burst pattern, which are combined to produce a position signal. Typical burst patterns are discussed in co-pending and assigned patent application Ser. No. 09/300,071, entitled "POSITION ERROR SIGNAL LINEARIZATION USING AN AUXILIARY DISCONTINUITY REMOVAL ROUTINE," by Jeff J. Dobbek, Gregory M. Frees, Craig N. Fukushima, Louis J. Serrano, and Markus Staudenmann, filed Apr. 27, 1999, which application is herein incorporated by reference.

The track identifier is commonly in the form of a grey code or track address and is used to uniquely identify the track currently beneath the transducer. The burst pattern produces an analog signal indicative of track type and head offset with respect to the center of the current track. If a quadrature burst pattern is used, the resulting analog signal is demodulated into primary (PESP) and quadrature (PESQ) signals. When the head moves transversely to the tracks during a seek operation, the track identifier and quadrature contributions are combined or "stitched" together to ideally provide a linear position signal.

In recent years, some disk drive designs have incorporated multiple separately controllable heads. Such designs are described, for example, in U.S. Pat. No. 5,805,386, issued to Faris on Sep. 8, 1998, U.S. Pat. No. 5,761,007, issued to Price et al. on Jun. 2, 1998, and U.S. Pat. No. 5,343,347, issued to Gilovich on Aug. 30, 1994, which applications are hereby incorporated by reference. Other disk drive designs have incorporated multiple voice coil motors to control a single head. Examples of such designs are disclosed in U.S. Pat. No. 5,621,591, issued to Rahimi et al. on Apr. 15, 1997, and U.S. Pat. No. 5,781,381, issued to Kokanezawa et al., which applications are hereby incorporated by reference. Such designs can improve performance by allowing one of the heads to read information, while another head is moving to another track location.

To provide separately controllable heads, at least one VCM for each head is typically used. Typically, each VCM uses a twisted pair of wires to carry the servo and data signal from a preamplifier inside the drive to an electric card. As the number of VCMs increases, the number of signal lines increases as well. For disk drive designs with several VCMs, such multiple wires can be impractical and expensive. Further, the use of several wires requires additional preamplifier input/output (I/O) ports.

What is needed is disk drive design that can accommodate multiple VCMs while minimizing the number of required wires and contacts. The present invention satisfies that need.

SUMMARY OF THE INVENTION

To address the requirements described above; the present invention discloses a method, apparatus, and article of manufacture, for controlling a disk drive with multiple VCMs.

The apparatus comprises a first disk storage surface and a second disk storage surface. The first disk storage surface has a plurality of first data segments and a plurality of first servo track segments interspersed therebetween, and is readable and writeable by a first head controllable according to a first servo track signal read from at least one of the first servo track segments. The second disk storage surface has a plurality of second data segments and a plurality of second servo track segments interspersed therebetween, and is readable and writeable a second head separately controllable from the first head according to a second servo track signal read from at least one of the plurality of second servo track segments. The first and second servo track signals are distinguishable by a servo signal characteristic, which allows a single signal transmittable on a single wire to convey the required servo track information to all of the heads.

The invention describes a technique for providing a track signal for each of a plurality of separately-controllable disk drive heads, each servicing an associated disk storage surface having a plurality of data segments and servo track segments storing a servo track signal interspersed therebetween. The method comprises the steps of reading the disk storage surfaces with each disk drive head in parallel to generate a servo track signal for each head, wherein the servo track signal from each head is distinguishable from the servo track signal for other heads by a servo signal characteristic; and combining the servo track signals from each head into a single servo track signal. The article of manufacture comprises a program storage device, readable by a computer, tangibly embodying at least one program of instructions executable by the computer to perform method steps described above.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
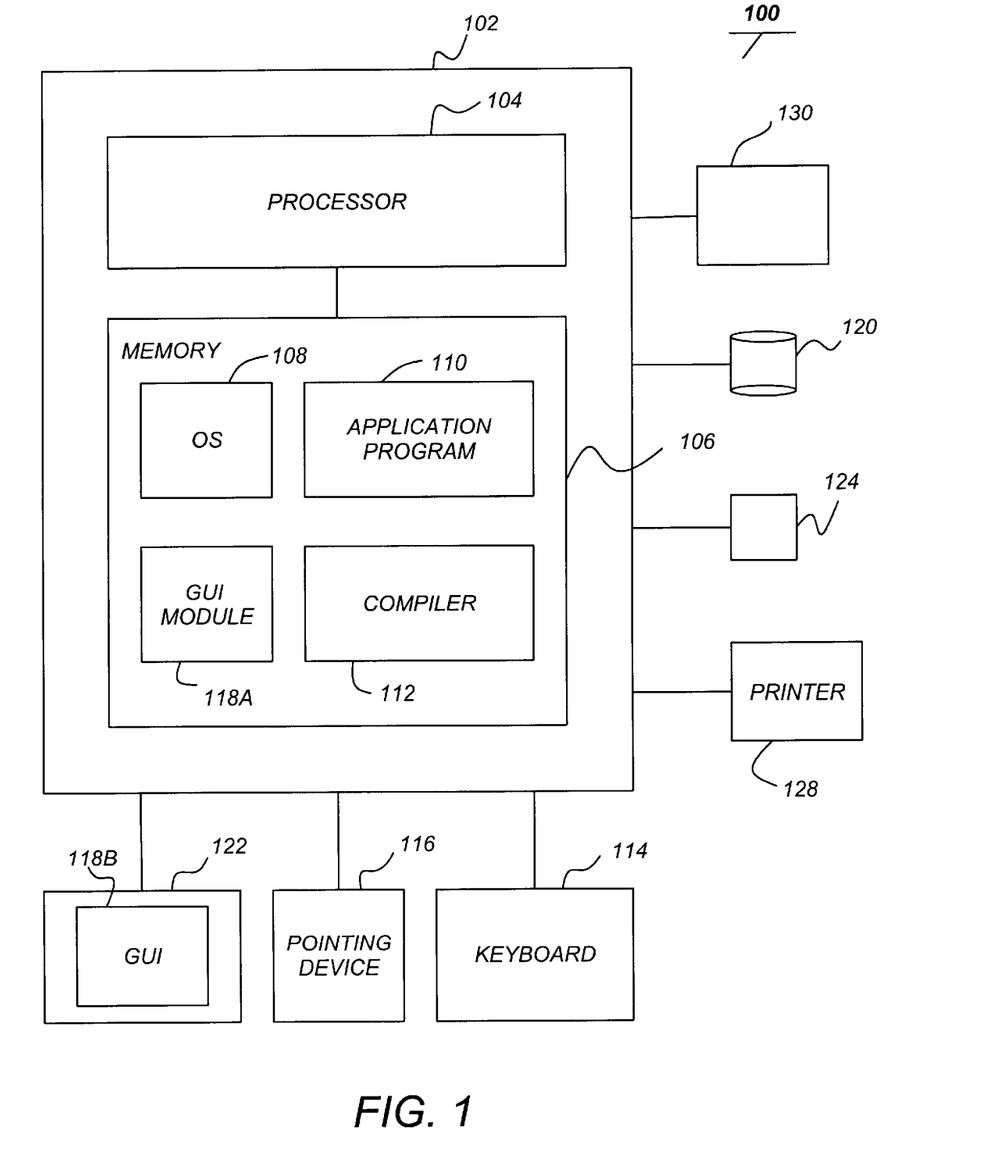
FIG. 1 is a diagram of internal components of a disk drive.

FIG. 1 illustrates an exemplary computer system 100 that could be used to implement the invention described herein. The computer system comprises a computer 102 having a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 may also implement a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, instructions implementing the operating system 108, the computer program 110, and the compiler 112 are tangibly embodied in a computer-readable mediun, e.g., data storage device 120, which could include one or more fixed or removable data storage devices, such as a zip drive, floppy disc drive, hard drive 124, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions for the computer or any of the peripherals such as the storage devices may also be tangibly embodied in memory 106, data communications devices, or memory in the peripherals themselves, thereby making a computer program product or article of manufacture according to the invention. As such, the terms "article of manufacture," "computer program product," or "program storage device" as used herein are intended to encompass a computer program accessible from any computer readable device or media, including memory structures used in the computer subsystems such as a hard drive controller.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
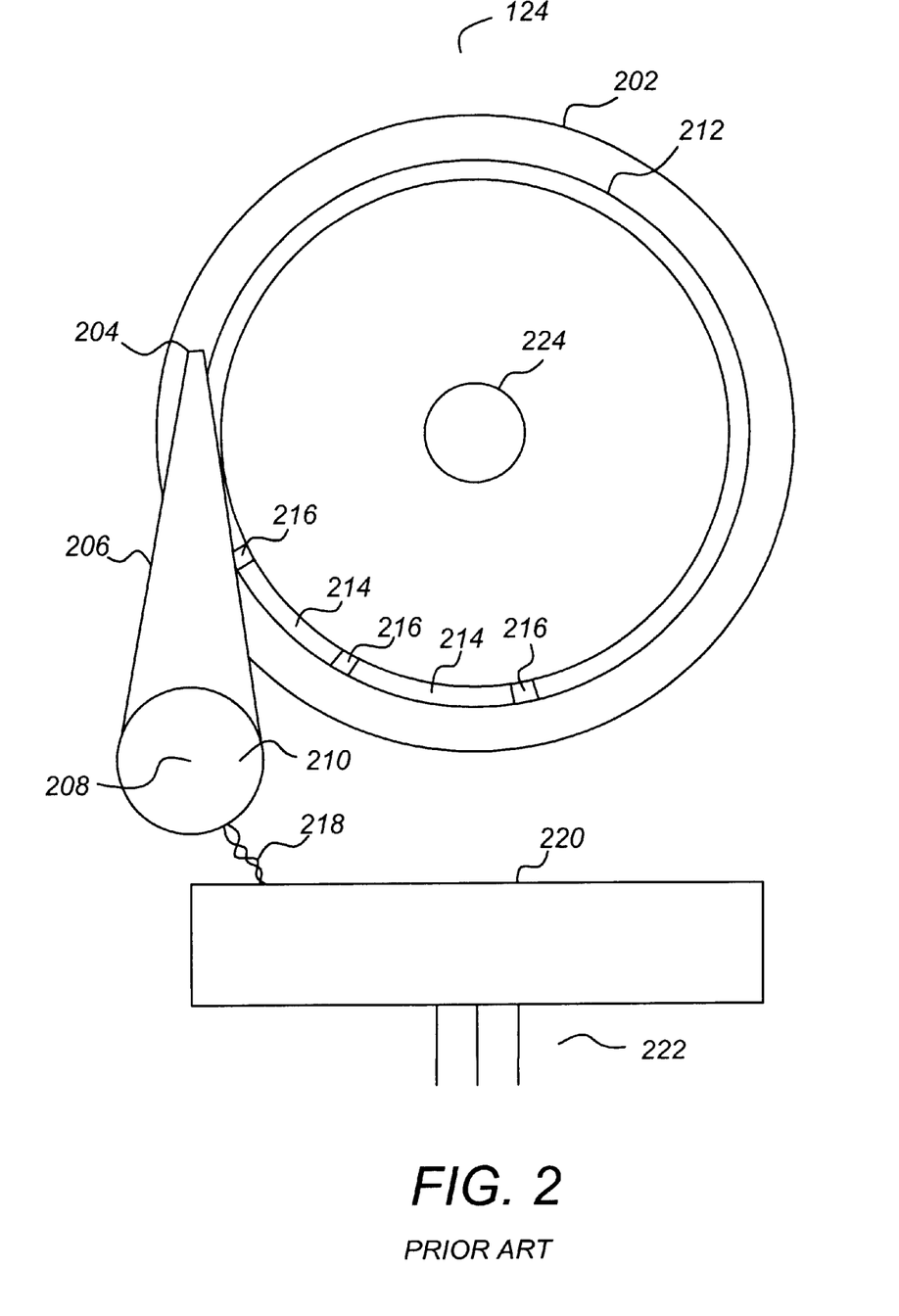
FIG. 2 is a diagram of an exemplary disk drive.

FIG. 2 is a diagram of an exemplary disk drive 124. The hard drive 124 includes one or more disk storage surfaces 202 serviced by a head or other transducer disposed on an arm 206 at a location substantially distal from the arm pivot 208. The arm 206 is pivoted about the aim pivot 208 axis by application of electrical current to a VCM 210, thus moving the transducer 204 across the disk storage surface 202. When the arm 206 remains in one angular position, and the disk storage surface is rotated by the spindle 224, the transducer 204 sweeps out a track 212 on the disk storage surface 202. The track 212 includes data segments 214, and interspersed non-data segments 216. As described in the references discussed above, the non-data segments 216 may include one or more servo burst signals. These servo burst signals are used to determine the position of the head 204 relative to the track 212. These servo signals (as well as data signals corresponding to the data segments 214 are provided to an electronic card. In one embodiment, the signal from the head 204 is a low voltage signal, and is provided to the card 220 via a twisted pair of wires 218 to reduce noise. Preamplifiers in the card 220 amplify the servo and data signals before they are provided external to the card using one or more lines 222. The servo signal is processed and provided to the VCM 210 to provide closed loop control over the head 204 position.

For purposes of simplicity, FIG. 2 shows only one disk storage surface 202, one head 204 and one arm 206. Where a plurality of separately controllable arms or arm segments are used, the number of wires from to convey the data and servo signals can become excessive.

Figure 3:
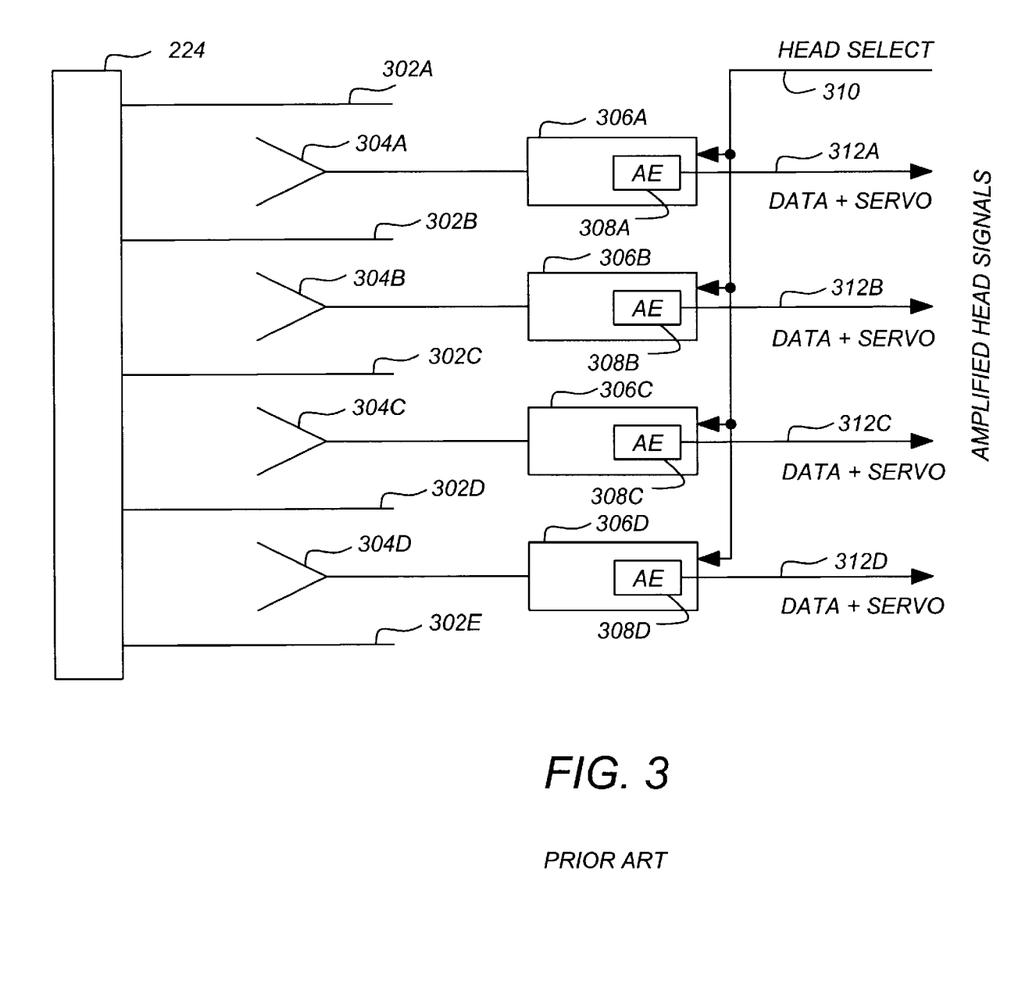
FIG. 3 is a diagram of a conventional disk drive having multiple separately controllable heads.

FIG. 3 is a diagram of a conventional disk drive 300 having multiple separately controllable heads. The disk drive 300 comprises a plurality of disk storage surfaces 302A–302E (collectively referred to hereinafter as disk surfaces(s) 302). Spinning motion is imparted to the disk surfaces 302 by the spindle 224. Data can be read from or written to each disk surface 302 by an associated head or transducer 304A–304E (collectively referred to hereinafter as head(s) 304). Each head 304A–304D is suspended by an attached arm 314A–314D, respectively, and each arm 314A–314D is moved across the heads associated disk surface 302 by VCMs 306A–306D, respectively. Data read by the heads 304A–304D is provided by a twisted pair of wires to a preamplifier 308A–308D, where the amplitude of the signal is increased. The data and servo information is then transmitted to an electronic card or other I/O device via separate data stream lines 312A–312D.

Figure 4:
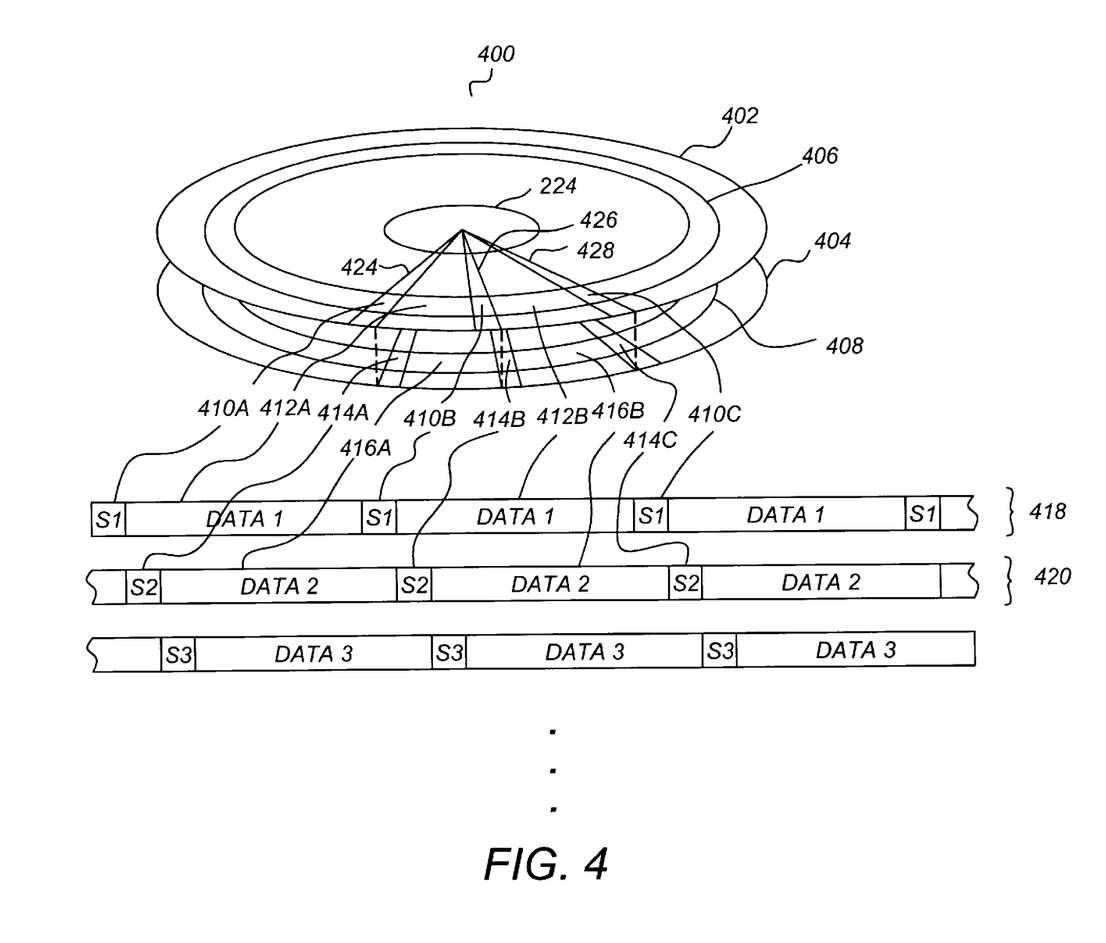
FIG. 4 is a diagram of one embodiment of the present invention showing the arrangement and relationship between servo track segments on different disks.

FIG. 4 is a diagram of one embodiment of the present invention, showing the arrangement and relationship between servo track segments on different disks in a disk drive 400 with multiple and separately controllable heads (hereinafter referred to as simply "disk drive").

The disk drive 400 is shown with a first disk storage surface 402 and a second disk storage surface 404. The first disk storage surface 402 comprises a first disk storage surface track 406, which includes a plurality of first data segments 412A and 412B and a plurality of first servo track segments 410A, 410B, and 410C, interspersed therebetween. The second disk storage surface 404 comprises a second disk storage surface track 408, which includes a plurality of second data segments 416A and 416B, and a plurality of second servo track segments 414A 414B and 414C interspersed therebetween.

The head reading the first disk storage surface 402 produces a data stream 418 having a first servo signal corresponding to the first servo track segment 410A, and a first data signal corresponding to first data segment 412A, and so forth. Similarly, the head reading the second disk surface 404 produces a data stream 420 having a second servo signal corresponding to the second servo track segment 414A, the second data signal corresponding to the second data segment 416A, and so forth.

As shown by the timing relationship between the first data stream 418, the second data stream 420 and the third data stream 422, the servo data segments for the second disk storage surface 404 are horizontally offset from those of the first disk storage surface 404. Hence, as the data streams 418–422 are read out, the second servo signals 414A 414B and 414C are timed to occur soon or immediately after the first servo signals (410A, 410B, and 410C, respectively). The physical displacement of the second servo track segments 414A, 414B, and 414C from the first servo signals 410A, 410B, and 410C therefore result in a temporal displacement when the respective signals are read out. This temporal displacement provides a servo signal characteristic that can be used to distinguish between the servo signals originating from the first storage surface 402 (arid hence a first transducer and its associated VCM) and the second storage surface 404 (and hence a second transducer and its associated VCM). Since the servo signals are distinguishable from one another, and because the servo signals are typically short in duration, the servo signal characteristic can be used to combine the servo signals into a single wire or twisted wire pair.

Figure 5:
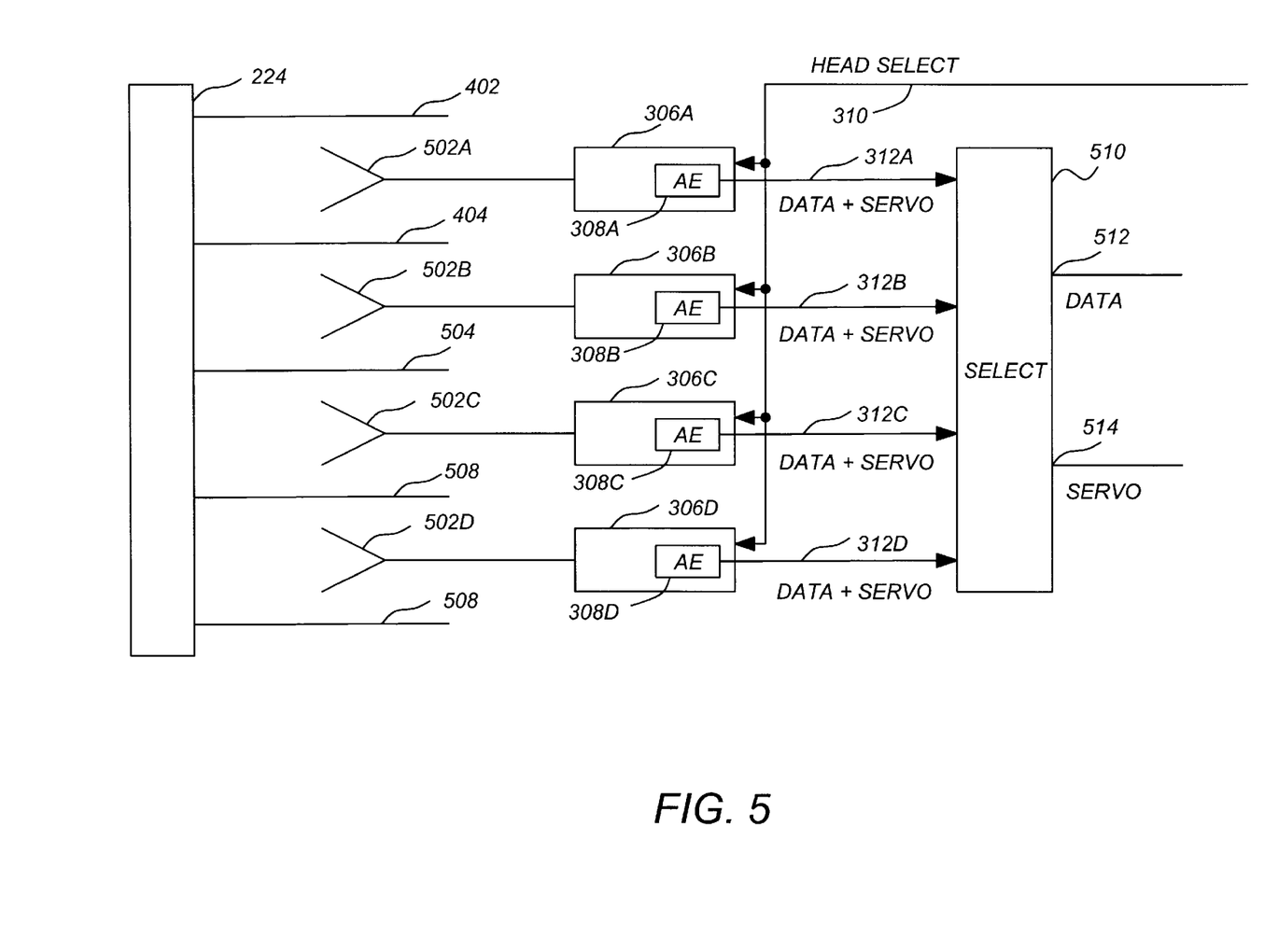
FIG. 5 is a diagram showing one embodiment of a disk drive implementing the present invention.

FIG. 5 is a diagram showing one embodiment of a disk drive implementing the present invention. The disk drive 400 comprises a first disk storage surface 402 and the second disk storage surface 404, and may also comprise a plurality of other disk storage surfaces 504–508. First data segments 412A and 412B and the plurality of first servo track segments 410A, 4101B, and 410C can be written to the first disk storage surface 402 and read from the first disk storage surface by a first transducer or head 502A. Similarly, second data segments 416A and 416B and the plurality of first servo track segments 414A 414B and 414C can be written to the first disk storage surface 402 and read from the first disk storage surface by a second transducer or head 502B.

The first head 502A provides a data stream 418 to a first preamplifier 308A via a twisted pair of wires. The preamplifier 308A amplifies the signal from the head 502A, and provides the signal to a decoder 510. Similarly, the second head 502B provides a data stream 420 to a second preamplifier 308B, where the signal is amplified and provided to the decoder 510. The head select signal 310 determines selects one or more of the heads 502A–502D, and is used by the decoder 510 to distinguish between the first track signal from the first track segments 410A, 410B, and 410C and the second track signal from the second track segments 414A, 414B, and 414C. The decoder 510 decodes the DATA+ SERVO signals 312A–312D from the preamplifiers 306A–306D according to the head select signal 310 and using the servo signal characteristic, and provides the decoded data signals to the first port 512 and the decoded servo signals to the second port 412. The decoded data signals are provided to the I/O card of the disk drive for delivery to the computer 102. The decoded servo signals are processed, and provided to the appropriate VCMs.

Figure 6A:
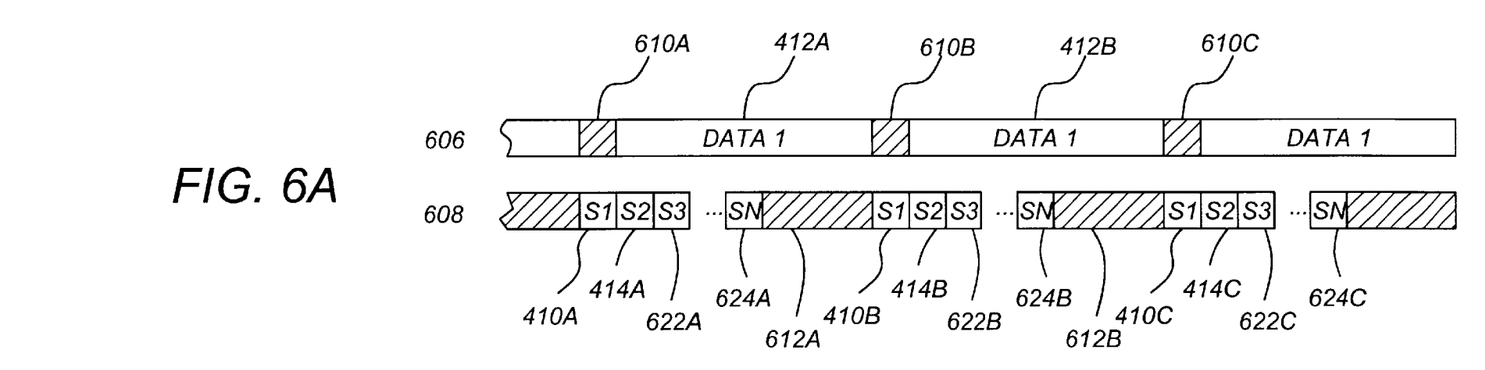
FIGS. 6A and 6B are diagrams showing data provided the data port and the servo port.

FIG. 6A is a diagram showing the data provided by the data port 512 and the servo port 514. When the first head 502A is selected by the head select signal 310, the data port 512 produces data content data stream 606 and the servo port 514 produces the servo data stream 608. The data content data stream 606 comprises a serial stream of the first data segments 412A 412B and 412C, separated by blank spaces 610A–610C. The servo data stream 608 provides the first servo track segment from the first head 410A, then the first servo track segment from the second head 414A, and so on, for each head in the disk drive 400. If the space between servo track segments and the number of heads permits, a the servo data stream 608 then includes a blank space 612A. Then, the next first servo track segment 410B followed by the next servo track segment from the second head 414A is provided and so on. Hence, the servo data stream 608 provides a time-division multiplexed version of the servo signals from each head. To assure that the data content data stream 606 and the servo data stream 608 are properly synchronized, a clock can be provided to synchronize both data streams.

Figure 6B:
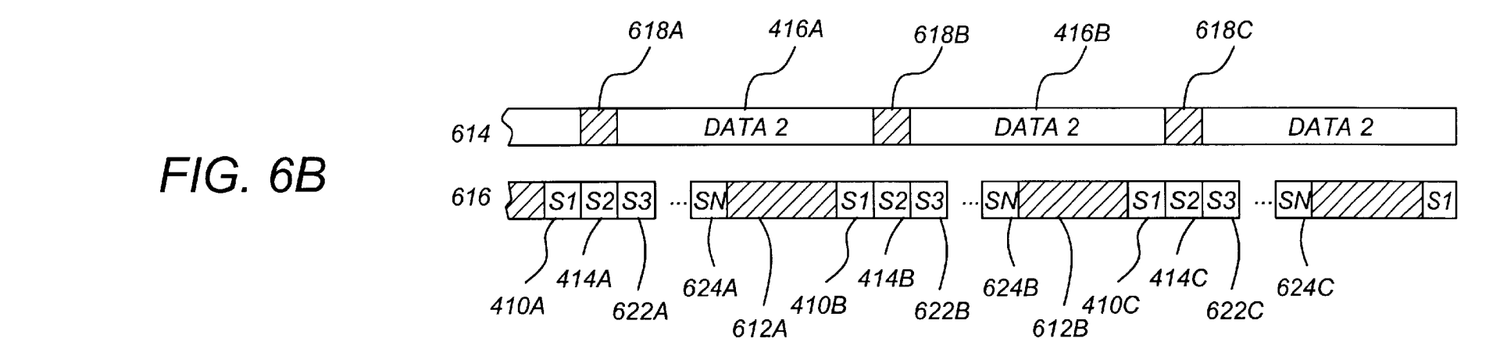

FIG. 6B is a diagram showing the output of the decoder 510 when the second head is selected. In this case, the data port 512 produces a data content data stream 614 comprising a serial stream of the second data segments 416A and 416B, separated by blank spaces 618A and 6118B. Similarly, the servo port 514 provides a time-division multiplexed version of the servo signals from each head, as described above with respect to FIG. 6A. In this case, the signal at the servo port 514 is also advanced in time, so that the servo signal from the second head is provided at the servo port 514 at the same time the blank space is provided by the data port 618.

Figure 7:
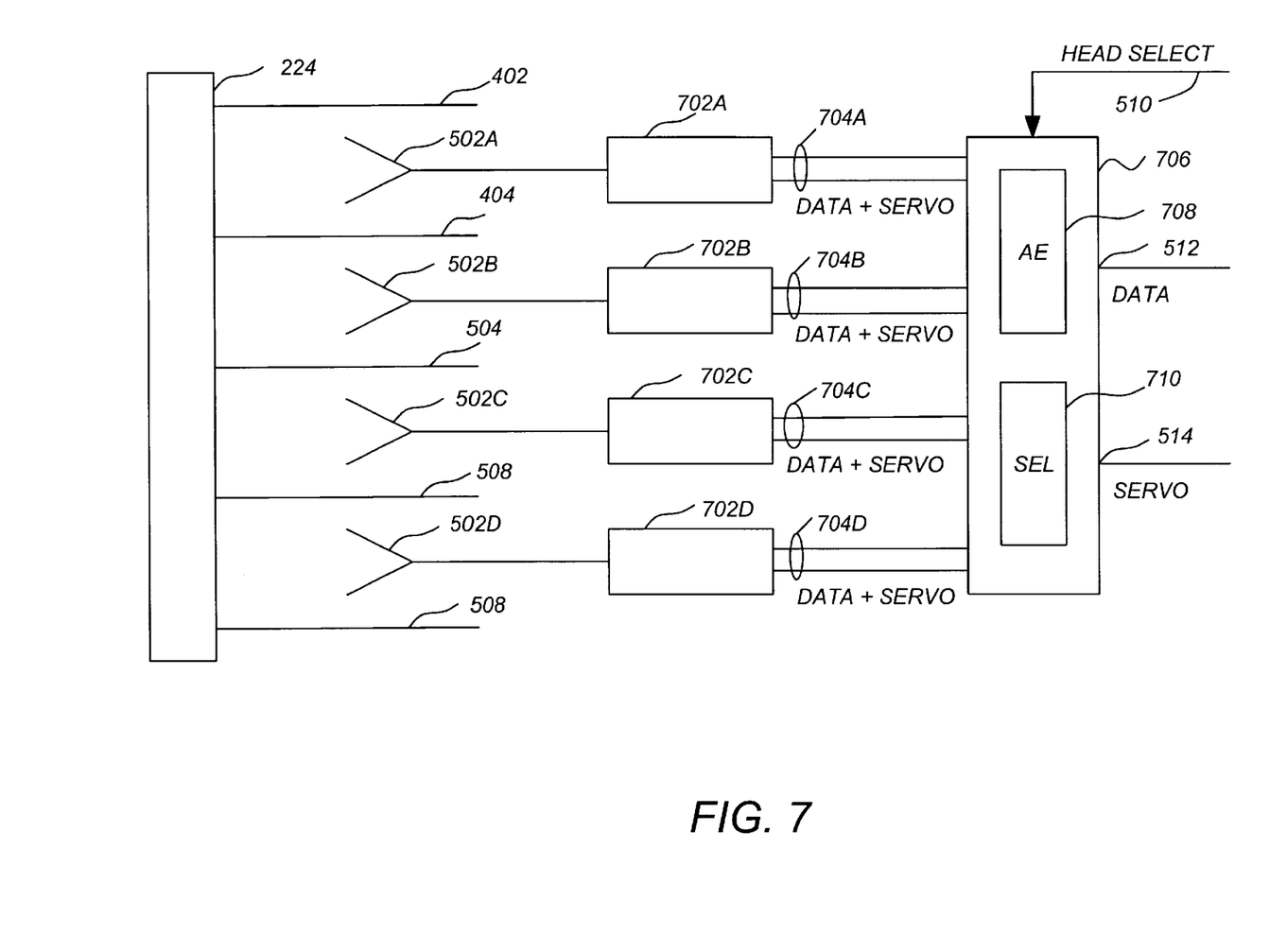
FIG. 7 is a diagram illustrating an alternative embodiment of the present invention.

FIG. 7 is a diagram illustrating another embodiment of the present invention in which the signal from the heads 502A–502D are sent via twisted pairs 704A–704D to a decoder 510 having a shared preamplifier 708 operating cooperatively with a selection module 710 to generate the data streams shown in FIGS. 6A and 6B.

Figure 8:
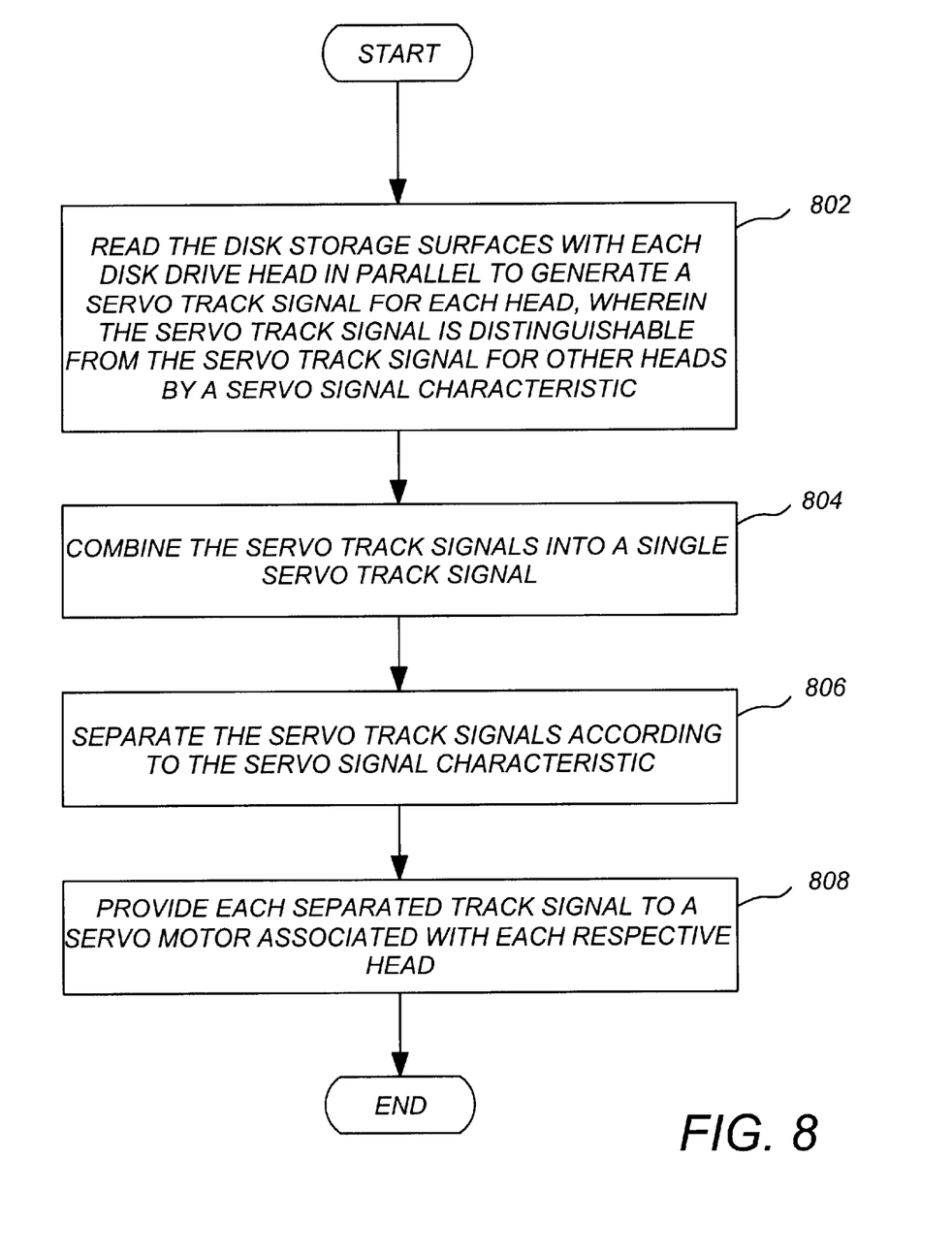
FIG. 8 is a flow chart presenting exemplary process steps used to control the heads.

FIG. 8 is a flow chart presenting exemplary process steps used to practice one embodiment of the present invention. First, disc storage surfaces are read with each disk drive head in parallel, as shown in block 802. This provides a servo track signal for each head, which is distinguishable from the servo track signal for other heads by a servo track signal characteristic. In one embodiment of the invention, the servo track signal characteristic is the timing of the servo track signals from each of the heads. In another embodiment, the servo track signal characteristic is a servo burst pattern, amplitude, or other characteristic. In block 804, the servo track signals are combined into a single servo track signal. Block 806 uses the servo signal characteristic to demodulate the single servo track signal to separate the servo track signals. Then, in block 808, each separated servo track signal is processed and provided to a servo motor associated with each respective head.

Figure 9:
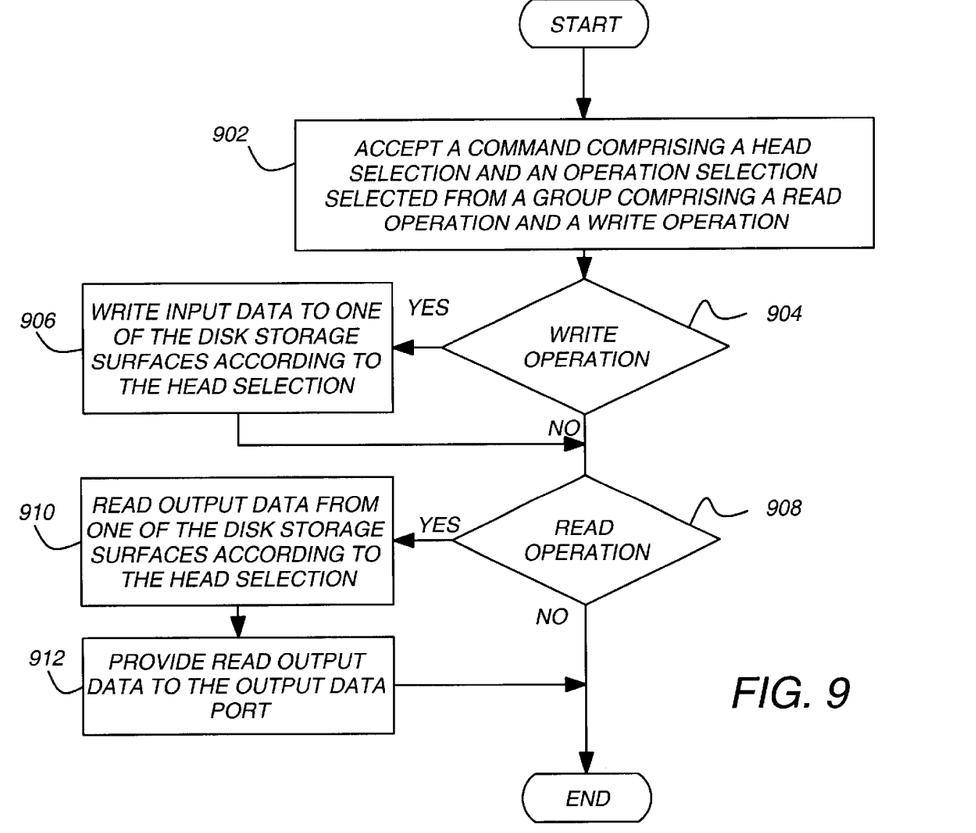
FIG. 9 is a flow chart presenting exemplary process steps used to read and write data from the disk drive.

FIG. 9 is a diagram of exemplary process steps used to read or write data using the present invention. These steps are generally performed while the process steps described in FIG. 8 are being performed to control the heads position over the disk storage surfaces. First, a command is accepted by the disk drive, as shown in block 902. The command comprises a head selection (and, generally a track and sector selection as well), and an operation selected from a group comprising a read operation and a write operation. If a write operation is selected, input data is written to one of the storage surfaces according to the head selection. This is depicted in blocks 904 and 906. If the operation is a read operation, output data is read from one of the disk surfaces according to the head selection, and provided to the output data port, as illustrated in blocks 910 and 912.

While the foregoing has been described with respect to temporally displaced servo signal timing patterns, the present invention encompasses other embodiments as well. For example, as described in the U.S. Patent references cited above, the servo signal typically comprises a servo burst pattern. The present invention can be practiced by using different servo burst patterns for each of the heads. In this situation, the second servo track segments 414A 414B and 414C need not be spatially displaced from the first servo track segments 410A, 4101B, and 410C, nor do the servo track portions of data streams 418–422 need temporally displaced. Instead, a demodulator or similar device can be used to detect which of the servo bursts is was read by which head. Alternatively any modulation scheme can be used to combine the measured signals from the servo segments so that they can be combined on a single data line, and detected and demodulated when needed.

Conclusion

This concludes the description of the preferred embodiments of the present invention. In summary, the present invention describes a method, apparatus, and article of manufacture for controlling a disk drive with multiple VCMs.

The apparatus comprises a first disk storage surface and a second disk storage surface. The first disk storage surface has a plurality of first data segments and a plurality of first servo track segments interspersed therebetween, and is readable and writeable by a first head controllable according to a first servo track signal read from at least one of the first servo track segments. The second disk storage surface has a plurality of second data segments and a plurality of second servo track segments interspersed therebetween, and is readable and writeable a second head separately controllable from the first head according to a second servo track signal read from at least one of the plurality of second servo track segments. The first and second servo track signals are distinguishable by a servo signal characteristic, which allows a single signal transmittable on a single wire to convey the required servo track information to all of the heads.

A method of describes a technique for providing a track signal for each of a plurality of separately-controllable disk drive heads, each servicing an associated disk storage surface having a plurality of data segments and servo track segments storing a servo track signal interspersed therebetween. The method comprises the steps of reading the disk storage surfaces with each disk drive head in parallel to generate a servo track signal for each head, wherein the servo track signal from each head is distinguishable from the servo track signal for other heads by a servo signal characteristic; and combining the servo track signals from each head into a single servo track signal. The article of manufacture comprises a program storage device, readable by a computer, tangibly embodying at least one program of instructions executable by the computer to perform method steps described above.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing a track signal for each of a plurality of separately-controllable disk drive heads, each servicing an associated disk storage surface having a plurality of data segments and servo track segments storing a servo track signal interspersed therebetween, the method comprising the steps of:

reading the disk storage surfaces with each disk drive head in parallel to generate a servo track signal for each head, wherein the servo track signal from each head is distinguishable from the servo track signal for other heads by a servo signal characteristic; and combining the servo track signals from each head into a single servo track signal.

2. The method of claim 1, further comprising the step of separating the servo track signals according to the servo signal characteristic.

3. The method of claim 2, further comprising the step of providing the each separated servo track signal to a servo motor associated with each respective head.

4. The method of claim 1, wherein the servo signal characteristic is a servo burst pattern.

5. The method of claim 1, wherein each servo signal is a servo timing pattern such that each servo signal is temporally displaced from other servo signals.

6. The method of claim 1, further comprising the steps of:

accepting a command comprising a head selection and an operation selection selected from a group comprising a write operation and a read operation;

writing input data to one of the disk storage surfaces according to the head selection when the operation is a write operation; and reading output data from one of the disk storage surfaces according to the head selection, and providing the output data to an output data port when the operation is a write operation.

7. A program storage device, readable by a computer, tangibly embodying at least one program of instructions executable by the computer to perform method steps of providing a track signal for each of a plurality of separately-controllable disk drive heads, each servicing an associated disk storage surface having a plurality of data segments and servo track segments storing a servo track signal interspersed therebetween, the method steps comprising the steps of:

reading the disk storage surfaces with each disk drive head in parallel to generate a servo track signal for each head, wherein the servo track signal from each head is distinguishable from the servo track signal for other heads by a servo signal characteristic; and combining the servo track signals from each head into a single servo track signal.

8. The program storage device of claim 7, wherein the method steps further comprise the method step of separating the servo track signals according to the servo signal characteristic.

9. The program storage device of claim 8, wherein the method steps further comprise the step of providing the each separated servo track signal to a servo motor associated with each respective head.

10. The program storage device of claim 7, wherein the servo signal characteristic is a servo burst pattern.

11. The program storage device of claim 7, wherein each servo signal is a servo timing pattern such that each servo signal is temporally displaced from other servo signals.

12. The program storage device of claim 7, wherein the method steps further comprise the steps of:

accepting a command comprising a head selection and an operation selection selected from a group comprising a write operation and a read operation;

writing input data to one of the disk storage surfaces according to the head selection when the operation is a write operation; and reading output data from one of the disk storage surfaces according to the head selection, and providing the output data to an output data port when the operation is a write operation.

* * * * *